US009139969B2

(12) United States Patent
Hartley (10) Patent No.: US 9,139,969 B2
(45) Date of Patent: Sep. 22, 2015

(54) VACUUM HOSE HANDLING SYSTEMS AND APPARATUSES

(76) Inventor: Dwight Hartley, Bay City, MI (US)

( * ) Notice: Subject to any disclaimer, the term of this patent is extended or adjusted under 35 U.S.C. 154(b) by 515 days.

(21) Appl. No.: 13/444,433

(22) Filed: Apr. 11, 2012

(65) Prior Publication Data
US 2013/0269150 A1    Oct. 17, 2013

(51) Int. Cl.
*E01H 1/08*     (2006.01)
*B08B 5/04*     (2006.01)
*B08B 9/08*     (2006.01)
*F16L 3/217*    (2006.01)

(52) U.S. Cl.
CPC ................ *E01H 1/0836* (2013.01); *B08B 5/04* (2013.01); *B08B 9/08* (2013.01); *F16L 3/217* (2013.01); *E01H 1/0827* (2013.01)

(58) Field of Classification Search
CPC . A47L 2201/00; E01H 1/0836; E01H 1/0863; E01H 1/0827; A01G 1/125; B08B 5/04; B08B 9/08; F16L 3/217

USPC ........... 15/340.1, 302, 315, 352, 353; 248/49, 248/125.7, 274.1
See application file for complete search history.

(56) References Cited

U.S. PATENT DOCUMENTS

| 4,207,647 A * | 6/1980 | Masters ........................ 15/302 |
| 2010/0196129 A1 * | 8/2010 | Buckner ...................... 414/467 |

* cited by examiner

*Primary Examiner* — Robert Scruggs
(74) *Attorney, Agent, or Firm* — Maschoff Brennan (57) ABSTRACT

Vacuum hose handling apparatuses and systems are disclosed herein. One exemplary implementation of the present disclosure includes a vacuum handling apparatus comprising a base, a support arm operatively coupled to the base, a connection hose configured to connect to an open end of an industrial vacuum hose, and a collection tube attached to the support arm and in fluid communication with the connection hose. In addition, the vacuum hose handling apparatus may be configured to allow movement of the collection tube relative to a corresponding collection vessel. Additional vacuum hose handling apparatuses and systems are also disclosed herein.

22 Claims, 10 Drawing Sheets

VACUUM HOSE HANDLING SYSTEMS AND APPARATUSES

BACKGROUND OF THE INVENTION

Vacuum trucks and other industrial vacuums are designed to pneumatically collect solids, liquids, sludge or slurry through vacuum hoses and into a tank or canister. Industrial vacuums are used in a variety of industries (e.g., petroleum, natural gas, drilling, etc.) and for collecting a variety of materials.

As a specific example, in drilling operations, a fluid commonly referred to as "mud" is circulated from the surface, downward through a drill pipe and out openings in the drill bit at the bottom of a borehole. The mud may include hydrocarbons, lubricants and other chemicals that assist in the drilling process. After exiting the drill bit at the bottom of the borehole, the mud along with other material from the borehole (often referred to collectively as "cuttings"), are pushed back upward through the borehole to the surface. Once at the surface, the cuttings that are extracted from the borehole may be processed in order to separate the mud from the other material. The mud may then be recycled and sent back down the drill pipe, and the material that is separated from the mud may be collected into a separate area or container. The material that is separated from the mud, which is commonly referred to as "sludge," may include a mixture of different solids, such as stone, dirt, clay, and salt. It is also common for sludge to include nonsolid components, such as water, oil, mud, and other fluids. In some instances, the drilling mud and sludge may be collected at a site or removed from a collection area/container using a vacuum truck. In particular, an operator may use the vacuum truck's vacuum/suction hose to pneumatically remove (e.g., suction) the materials from the collection area/container. Once the materials are collected, the vacuum truck can also be used to transport the collected materials to another site for treatment or disposal.

Although vacuum trucks and other industrial vacuums are very useful in a variety of settings, operation and handling of vacuum hoses can present a number of disadvantages and problems. First, because of the powerful suction forces created by the vacuums, manually handling vacuum hoses requires a great deal of physical strength and energy. This is aggravated by the need to keep the vacuum hoses at a proper position and angle with respect to the materials being suctioned in order to achieve the most efficient collection of the materials. The inability to manually maintain the suction hose at a proper position and angle often results in the inefficient collection of waste materials, thereby increasing the time and energy necessary to complete the collection process. In addition, manually handling the suction hose presents a number of safety and regulatory concerns. For example, manually handling the suction hose requires the handler to be located close to the end of the vacuum hose and/or within a collection area/container where the material being collected is located, which gives rise to risks of physical injury to the handler as well as regulatory restrictions for the handler and his/her employer.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Exemplary vacuum hose handling systems and apparatuses are disclosed herein. As will be described in more detail below, in certain implementations, the systems and devices disclosed herein may be configured to allow an operator to more efficiently and safely collect waste material using an industrial vacuum. One exemplary implementation of the present disclosure includes a vacuum hose handling apparatus having a base, a support arm operatively coupled to the base, a connection hose configured to connect to an open end of an industrial vacuum hose, and a collection tube attached to the support arm and in fluid communication with the connection hose. This exemplary vacuum hose handling apparatus may be configured to allow movement of the collection tube relative to a corresponding collection vessel. Additional vacuum hose handling apparatuses and systems are also disclosed herein.

The systems, devices, and apparatuses disclosed herein may be configured to attach to an open end of an industrial vacuum hose to allow a vacuum operator to effectively collect materials from a collection area or container without the safety concerns typically associated with industrial vacuums. In particular, the systems and devices disclosed herein may reduce or eliminate the need for manual handling of vacuum hoses and/or physical entry into waste material collection areas/containers. Additional benefits and/or advantages will be apparent from the details disclosed herein.

As used herein, the terms "vacuum" and "industrial vacuum" may refer to any suitable industrial vacuum device, system, or apparatus. For example, a vacuum may include a vacuum truck, a trailer-mounted industrial vacuum, a skid-mounted industrial vacuum, a permanent (e.g., immobile) industrial vacuum, a central industrial vacuum system, and/or any other suitable industrial vacuum. Examples of vacuum trucks include, but are not limited to, wet and dry vacuum trucks, liquid-only vacuum trucks, hydro-excavation vacuum trucks ("hydrovac trucks"), sewage vacuum trucks, and industrial air mover trucks. Vacuums may have varying sizes, capacities, and functions. Industrial vacuums may include structures and mechanisms to facilitate the process of pneumatically loading materials into the vacuums. For example, vacuums may include blowers, pumps, tanks, separators, filters, traps, silencers, boom lines, hose, pipes, and/or any other suitable features configured to allow the vacuums to pneumatically collect waste materials. In most circumstances, a vacuum includes a suction hose having an open end through which waste materials may be suctioned.

As used herein, the terms "hose," "vacuum hose," and "suction hose" may interchangeably refer to any suitable hose associated with an industrial vacuum and through which the industrial vacuum pneumatically collects waste materials. A vacuum hose may have any suitable size and configuration capable of use with industrial vacuum systems. For example, a vacuum hose may be generally tubular and have a diameter ranging from 1 inch to 8 inches or more. Additionally or alternatively, a vacuum hose may have any suitable length. Vacuum hoses may be flexible, semi-rigid, rigid, or a combination thereof. A vacuum hose may also be manufactured using any suitable material or combinations of materials (e.g., plastic, metals, etc.). For example, a vacuum hose may include PVC, polyurethane, thermoplastic elastomer, vinyl, steel wire reinforcement, any other suitable materials, and/or combinations thereof. In some examples, a vacuum hose may include multiple sections or portions having different characteristics/properties. A vacuum hose may have one or more couplers or fasteners configured to facilitate the connection of the vacuum hose to one or more additional hoses and/or other structures.

Industrial vacuums may be used to collect a variety of waste materials in various forms. Waste materials may include wet materials, dry materials, liquids, solids, gases, vapors, any other suitable materials, or combinations thereof. By way of example and not limitation, waste materials may include stone, dirt, debris, clay, salt, water, oil, dust, mud, sludge, slurry, hazardous waste, chemicals, sewage, etc.

Prior to collection by a vacuum, waste materials may be contained within a collection vessel. As used herein, the term "collection vessel" may refer to any suitable area or container configured to hold collected waste materials. A collection vessel may be natural or manmade as well as mobile or immobile. For example and not limitation, a collection vessel may include a pit, a pond, a lagoon, a tank, an open container, a basin, and/or any other suitable area, container, or receptacle.

Figure 1:
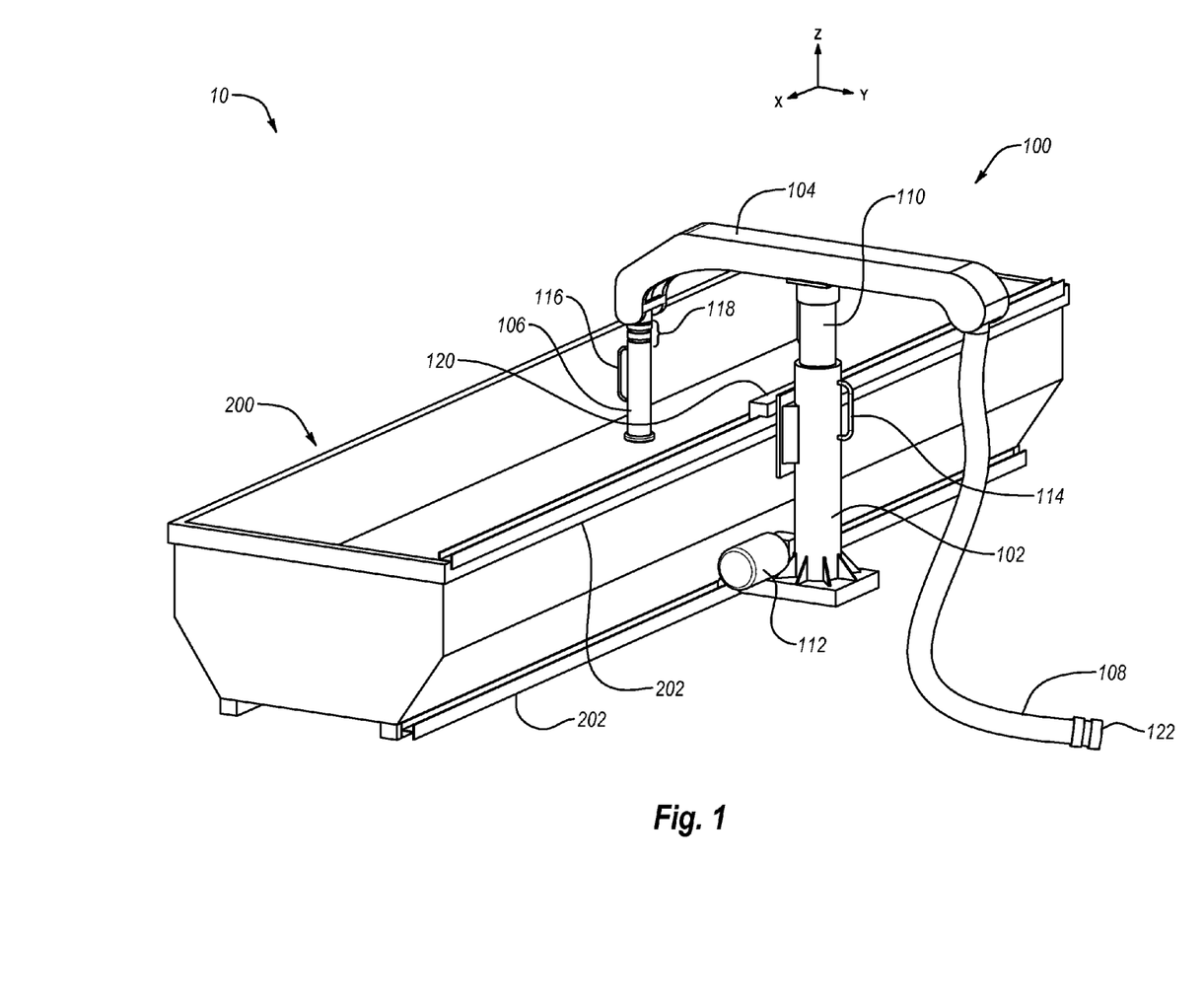
FIG. 1 illustrates an exemplary vacuum hose handling system, according to principles described herein.
Figure 2:
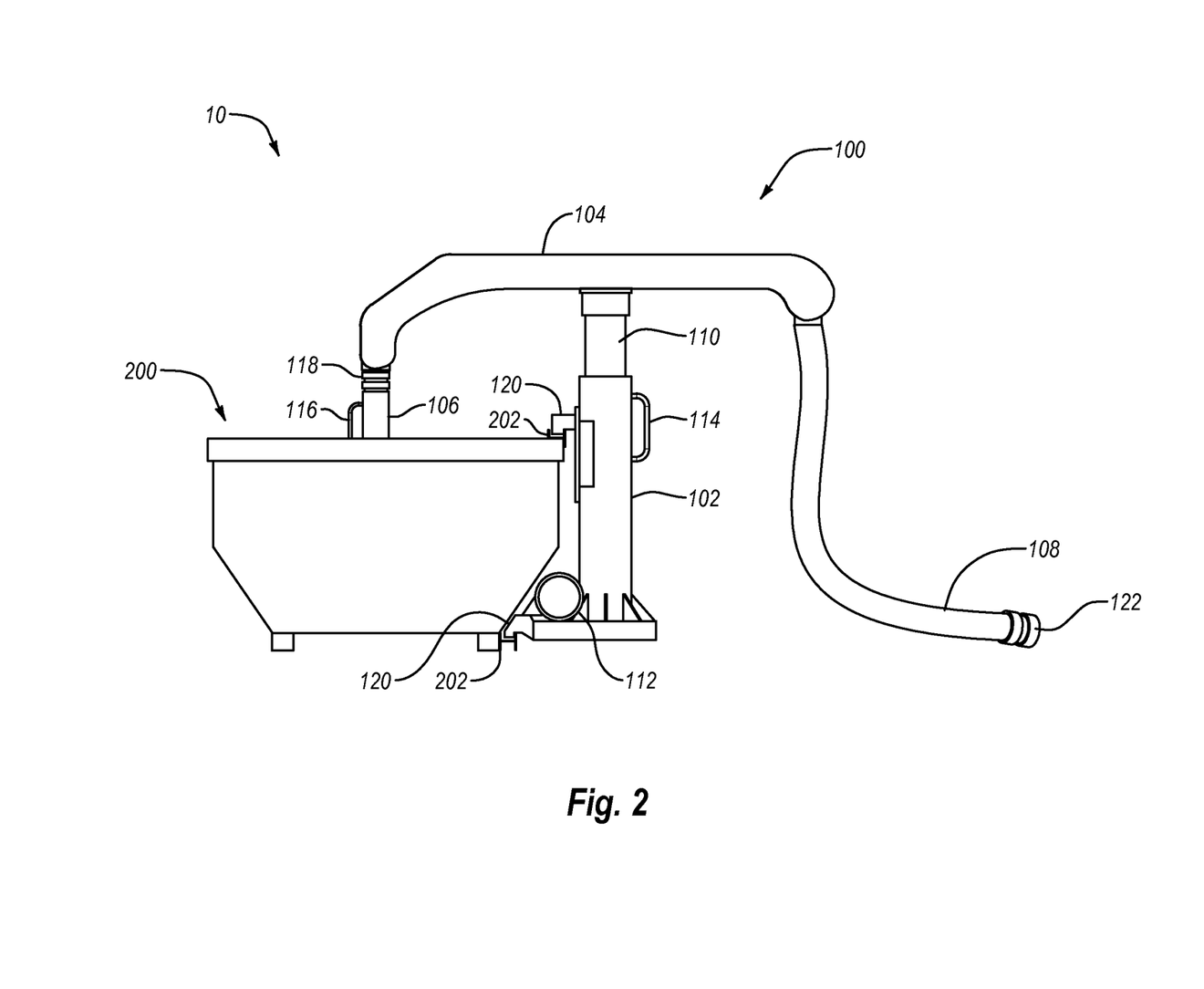
FIG. 2 illustrates an end view of the exemplary vacuum hose handling system of FIG. 1, according to principles described herein.
Figure 3:
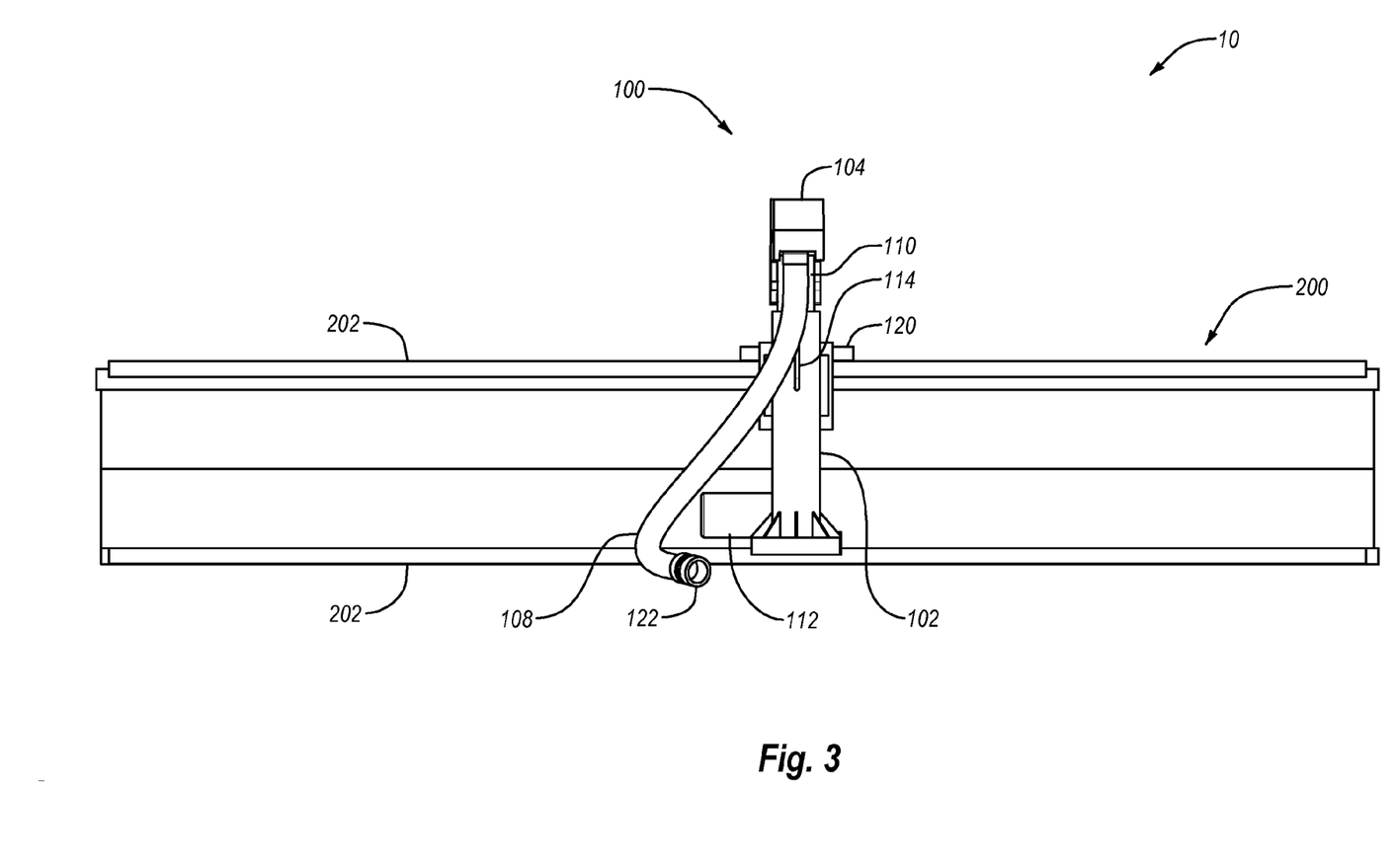
FIG. 3 illustrates a side view of the exemplary vacuum hose handling system of FIG. 1, according to principles described herein.
Figure 4:
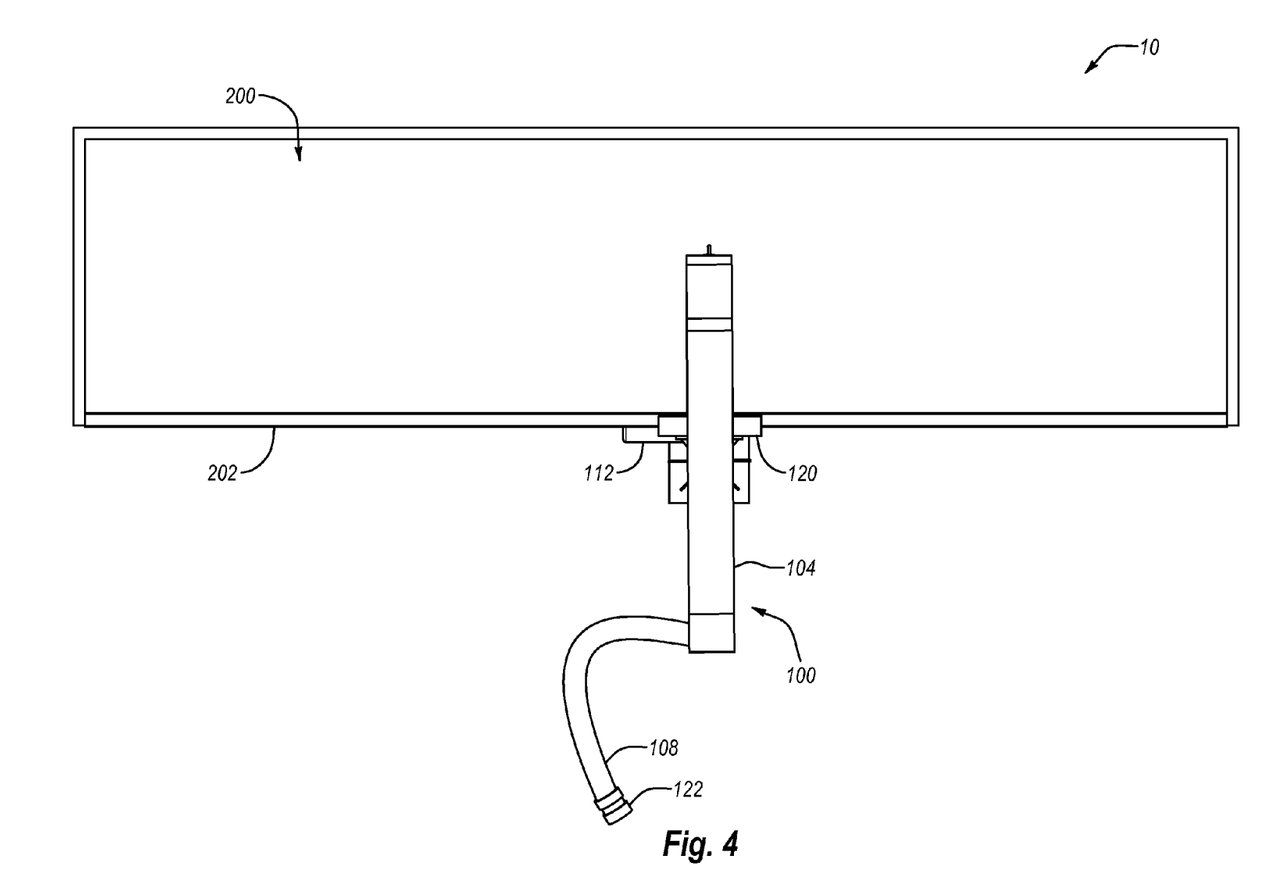
FIG. 4 illustrates a top view of the exemplary vacuum hose handling system of FIG. 1, according to principles described herein.

FIGS. 1-4 illustrate various views of an exemplary vacuum hose handling system 10 (or simply "system 10") according to principles described herein. In particular, FIG. 1 illustrates a perspective view of system 10; FIG. 2 illustrates an end view of system 10; FIG. 3 illustrates a side view of system 10; and FIG. 4 illustrates a top view of system 10.

As shown in FIGS. 1-4 and as will be explained in more detail below, system 10 may include a vacuum hose handling apparatus 100 (or simply "handling apparatus 100") configured to connect to an industrial vacuum hose to reduce the need of manual manipulation or handling of the vacuum hose. System 10 may also include an open collection vessel 200 configured to temporarily store waste materials.

As mentioned, handling apparatus 100 may be configured to reduce the need of manual manipulation or handling of a vacuum hose. For example, handling apparatus 100 may include devices, structures, and/or features configured to allow a vacuum operator/user to pneumatically collect waste materials from collection vessel 200 without the typical safety and efficiency problems associated with manual industrial vacuum hose handling.

As shown in FIGS. 1-4, handling apparatus 100 may include a base 102, a support arm 104 held up by base 102, a collection tube 106 through which waste materials may be pneumatically collected, and a connection hose 108 in fluid communication with collection tube 106 and configured to connect to an open end of a vacuum hose or otherwise connect to a vacuum. Handling apparatus 100 may additionally or alternatively include any other suitable features, structures, and/or devices configured to facilitate handling of a vacuum hose.

Base 102 may be configured to provide support and stability for handling apparatus 100. For example, base 102 may be configured to securely rest on and/or connect to an underlying surface (e.g., a ground surface, a floor, etc.) and/or structure (e.g., a frame, a container, a building, a vehicle, etc.). To illustrate, as shown in FIGS. 1-4, base 102 is coupled to and supported by collection vessel 200. Base 102 may also provide support for the other components of handling apparatus 100, including support arm 104, collection tube 106, and connection hose 108.

In some examples, base 102 may be configured to be at least partially mobile. For example, base 102 may be configured to move relative to collection vessel 200 to facilitate collection of waste materials located in different portions of collection vessel 200. Base 102 may be configured to move relative to collection vessel 200 in any suitable manner. In some examples, base 102 may be configured to roll, slide, rotate, or otherwise move to facilitate horizontal, vertical, and/or rotational movement of base 102 relative to collection vessel 200. To illustrate, FIGS. 1-4 show an implementation of handling apparatus 100 wherein base 102 is movably coupled to collection vessel 200. As shown, collection vessel 200 includes one or more rails 202 by way of which base 102 may attach to collection vessel 200. In turn, base 102 may include one or more connectors 120 configured to interface with and connect to rails 202. Accordingly, base 102 may slide back and forth (e.g., along the X-axis shown in FIG. 1) relative to collection vessel 200.

In some examples, connectors 120 may be configured to hook to, hang on, insert into, and/or otherwise interface with rails 202. The connection between connectors 120 and rails 202 may be configured to facilitate movement of base 102 relative to collection vessel 200. Additionally or alternatively, connectors 120 may include structures and/or features to facilitate movement of handling apparatus 100 relative to collection vessel 200. For example, connectors 120 may include one or more wheels, bearings, low-friction coatings or pads (e.g., Teflon pads), and/or any other suitable features to facilitate movement of base 102 along rails 202. Accordingly, base 102 may be free to move back and forth relative to collection vessel 200 along rails 202. In some examples, base 102 may include a handle 114 to facilitate manual movement of base 102 relative to collection vessel 200. Base 102 may additionally or alternatively be configured to move (e.g., slide, roll, etc.) across an underlying surface. For example, base 102 may include one or more wheels that rest upon the underlying surface and support base 102, thereby providing further support to base 102 while allowing base 102 to roll across the underlying surface.

Figure 5:
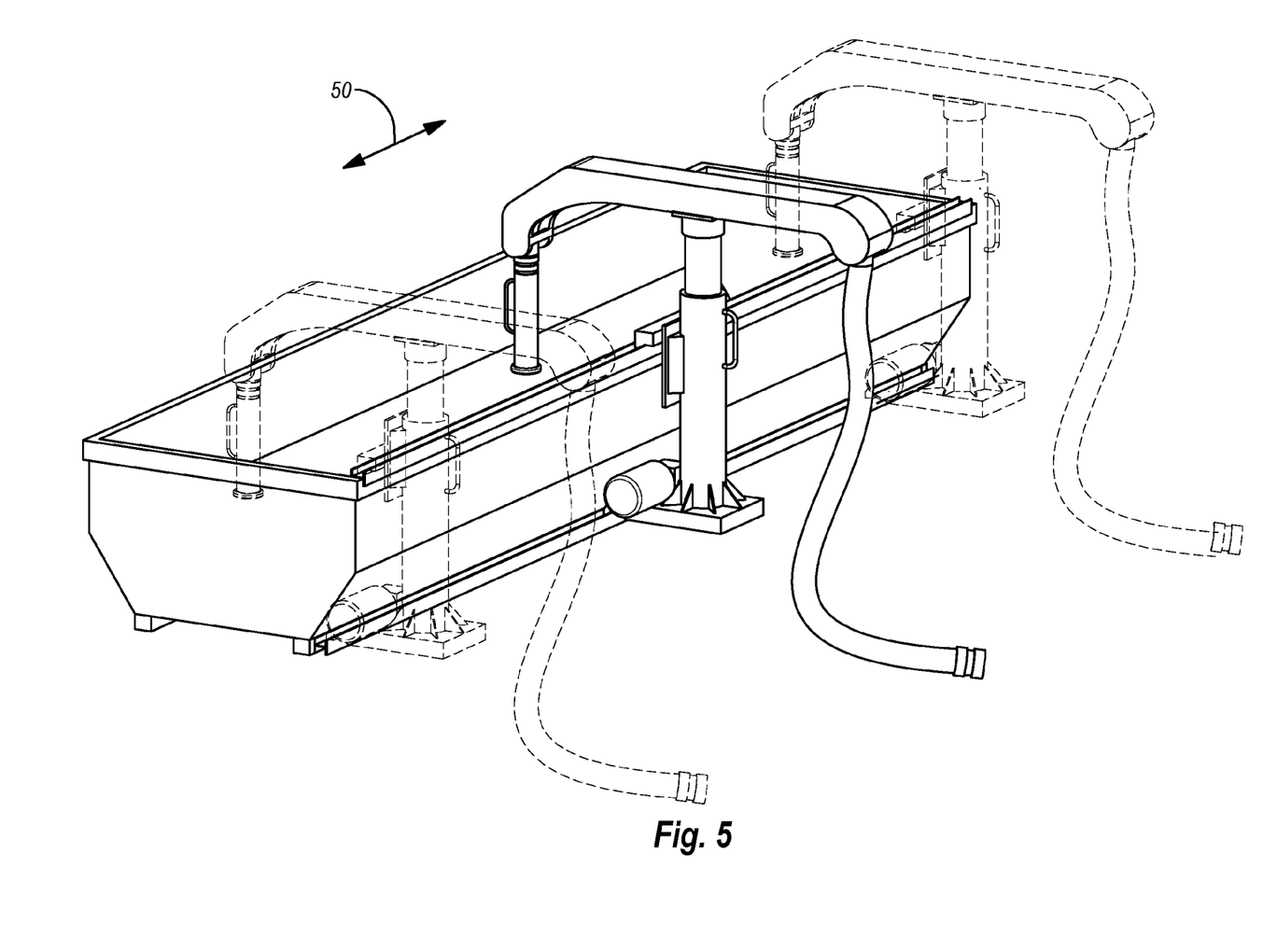
FIG. 5 illustrates a first degree of movement of the exemplary vacuum hose handling system of FIG. 1, according to principles described herein.

Exemplary movement of base 102 relative to collection vessel 200 is illustrated in more detail in FIG. 5. As shown, base 102 and, as a result, handling apparatus 100, may move back and forth relative to collection vessel 200 in the directions indicated by arrows 50. Accordingly, an operator may move base 102 in order to selectively reposition collection tube 106 within collection vessel 200 to collect materials from collection vessel 200.

Although two rails 202 and two connectors 120 are shown, in further implementations any other suitable number of rails 202 and/or connectors 120 may be utilized. Furthermore, although base 102 is illustrated as moving relative to collection vessel 200 along a single directional axis (e.g., along the direction of arrows 50 in FIG. 5), one will appreciate that base 102 may be configured to move relative to collection vessel 200 along any one or more additional or alternative directional axes.

Referring again to FIGS. 1-4, in some examples, movement of base 102 and handling apparatus 100 may be entirely independent of collection vessel 200. To illustrate, base 102 may be mounted on one or more wheels that allow base 102 to roll across an underlying surface. In some examples, the wheels may be configured to swivel to allow for multi-directional movement of base 102. Regardless of the foregoing examples, one will appreciate that base 102 and/or collection vessel 200 may be configured to move relative to one another in any other suitable manner as may be desirable for a particular implementation.

In some examples, the movement of base 102 relative to collection vessel 200 may be at least partially motorized or otherwise mechanically assisted. For example, handling apparatus 100 may include a drive mechanism configured to move and/or assist in moving base 102 relative to collection vessel 200. As used herein, the term "drive mechanism" may refer to any suitable mechanical, motorized, and/or other device configured to assist an operator's interaction with system 10 in any way. A drive mechanism may be powered by the operator, by a separate power source (e.g., a motor), or by a combination thereof. An exemplary drive mechanism may include a motor, a pump, a chain drive, a belt drive, a screw drive, a drive shaft, a gear drive, a pulley system, a lever, a jack, a hydraulic device, any other suitable device, and/or combinations thereof. As it relates to base 102, in some examples, a drive mechanism may be configured to move base 102 relative to collection vessel 200.

In some examples, movement of base 102 relative to collection vessel 200 may be controlled using a control panel or other control device mounted on or remotely located from handling apparatus 100. Additionally or alternatively, movement of base 102 may be at least partially automated and controlled in accordance with a predefined program and/or sensed parameters, as will be explained in more detail below.

Base 102 may have any suitable size, shape, and/or configuration necessary or desirable to support handling apparatus 100. In some examples, base 102 may include a generally planar bottom member (e.g., to rest upon a flat surface or support structure) and/or a vertical member extending upward from the bottom member and configured to support and/or connect to support arm 104. However, one will appreciate that base 102 can have any other suitable structures, sizes, shapes, and/or configurations.

In some examples, base 102 may include and/or be connected to support arm 104 by way of a telescoping member 110. Telescoping member 110 may be configured to connect to and provide support for support arm 104. Telescoping member 110 may be generally tubular and extend up from base 102 to attach to the underside of support arm 104. In some examples, telescoping member 110 may be movably coupled to base 102 and/or support arm 104. For example, telescoping member 110 may be configured to move vertically (e.g., raise and lower along the Z-axis shown in FIG. 1) and/or rotate (e.g., rotate about the Z-axis shown in FIG. 1) relative to base 102.

Movement of telescoping member 110 may be facilitated by the connection between base 102 and telescoping member 110. For example, telescoping member 110 may be operatively connected to base 102 in such a way that allows telescoping member 110 to selectively extend out of and/or retract into base 102 (e.g., similar to the function of a hydraulic cylinder, a telescope, or any other suitable telescoping device). Additionally or alternatively, telescoping member 110 may include and/or be supported by one or more bearings that allow telescoping member 110 to rotate relative to base 102.

As will be evident, movement of telescoping member 110 relative to base 102 results in movement of support arm 104 and collection tube 106 relative to base 102 and/or collection vessel 200. Accordingly, an operator may utilize the relative movement between telescoping member 110 and base 102 to achieve a desired movement of support arm 104 and/or collection tube 106 (e.g., to move collection tube 106 to a desirable position for suctioning waste materials out of collection vessel 200).

Figure 6:
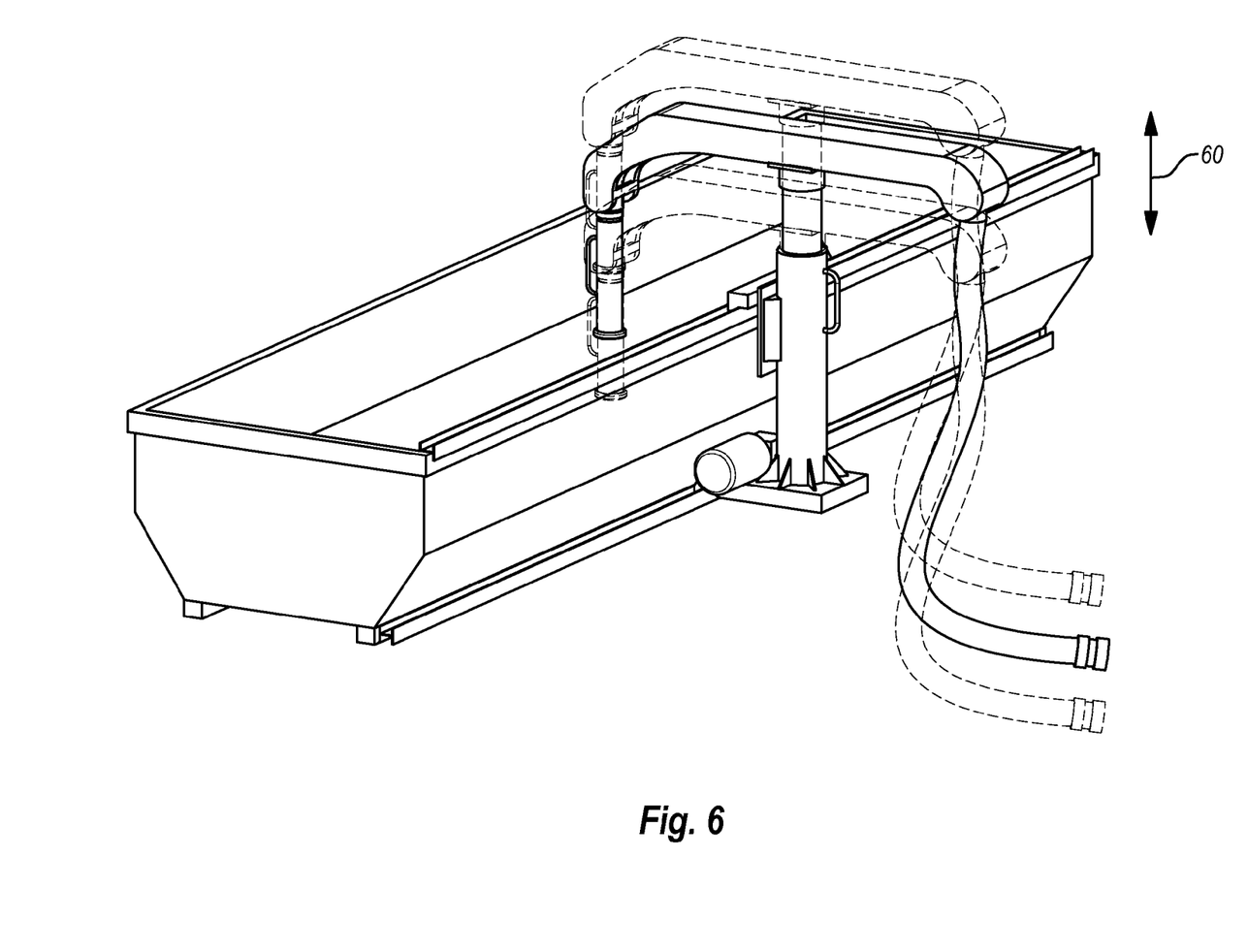
FIG. 6 illustrates another degree of movement of the exemplary vacuum hose handling system of FIG. 1, according to principles described herein.

Exemplary vertical movement of telescoping member 110 relative to base 102 and collection vessel 200 is illustrated in more detail in FIG. 6. As shown, telescoping member 110 and, as a result, support arm 104 may move up and down relative to base 102 and collection vessel 200 in the directions indicated by arrows 60. Accordingly, in operation, an operator may raise and lower telescoping member 110 to selectively raise and lower collection tube 106 within collection vessel 200 (e.g., in accordance with raising and lowering levels of waste materials).

Figure 7:
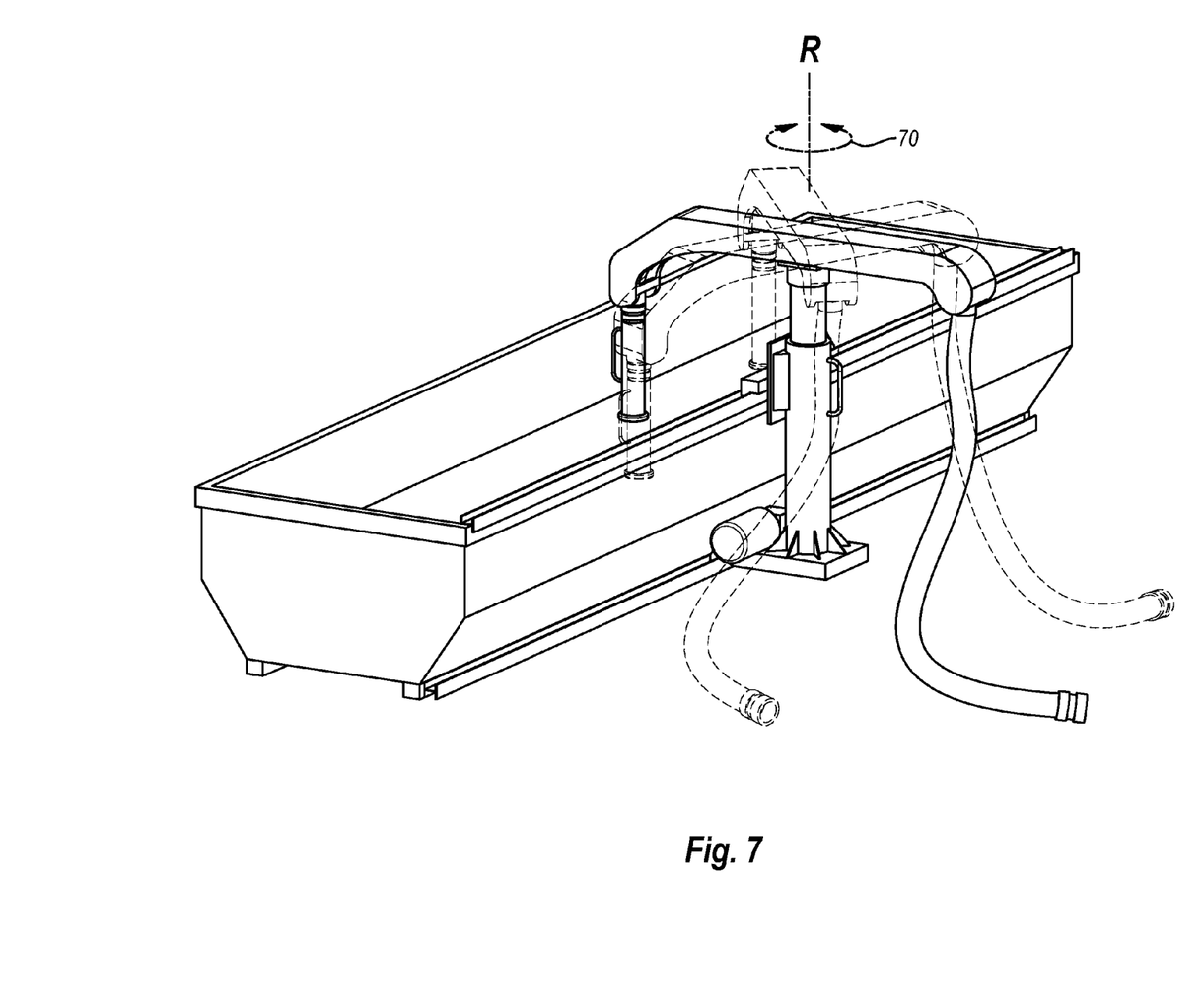
FIG. 7 illustrates a further degree of movement of the exemplary vacuum hose handling system of FIG. 1, according to principles described herein.

Exemplary rotational movement of telescoping member 110 and/or support arm 104 relative to base 102 and collection vessel 200 is illustrated in more detail in FIG. 7. As shown, telescoping member 110 and/or support arm 104 may rotate about a rotational axis R in the directions indicated by arrows 70. Rotation of telescoping member 110 may effectuate rotation of collection tube 106 about base 102 and effectuate horizontal translation of collection tube 106 relative to collection vessel 200. Accordingly, an operator may selectively rotate telescoping member 110 in order to achieve horizontal repositioning (e.g., along the X-axis and/or Y-axis shown in FIG. 1) relative to collection vessel 200 (e.g., to suction waste materials located at opposing sides of collection vessel 200).

Referring again to FIGS. 1-4, in some examples, movement of telescoping member 110 relative to base 102 may be achieved manually by an operator. For example, the operator may manually rotate, raise, and/or lower telescoping member 110 relative to base 102. Additionally or alternatively, movement of telescoping member 110 relative to base 102 may be facilitated/assisted by one or more drive mechanisms. To illustrate, handling apparatus 100 may include a hydraulic pump unit 112 configured to mechanically assist an operator to raise and lower telescoping member 110 relative to base 102. In some examples, the combination of base 102 and telescoping member 110 may be configured to function similar to a hydraulic cylinder. Accordingly, operator may selectively actuate hydraulic pump unit 112 to raise and lower telescoping member 110 to achieve a desired height of support arm 104 and/or collection tube 106 during and/or in preparation for a process of suctioning waste materials out of collection vessel 200. In additional or alternative embodiments, handling apparatus 100 may include any other suitable drive mechanism configured to assist the raising, lower, and/or rotating of telescoping member 110. As will be explained in more detail below, the movement of telescoping member 110 relative to base 102 may be at least partially automated and/or remotely controlled.

Base 102 and/or telescoping member 110 may be manufactured using any suitable materials (e.g., metals, plastics, composites, etc.). For example, base 102 and/or telescoping member 110 may be manufactured using structural steel. In some examples, multiple pieces (e.g., multiple steel plates, tubes, etc.) may be welded or otherwise fastened together to form base 102 and/or telescoping member 110.

As mentioned above, base 102 may support and/or attach to support arm 104. Support arm 104 may be configured to connect to, provide support for, maintain a position of, and/or partially house collection tube 106 and/or connection hose 108. In some examples, support arm 104 may have an elongate shape with collection tube 106 extending from a first end and connection hose 108 extending from an opposite end. Additionally or alternatively, support arm 104 may be supported by base 102 and/or telescoping member 110 at a point in between the opposing ends of support arm 104 (e.g., to form a T-shaped configuration).

Support arm 104 may be configured to facilitate direct or indirect fluid communication between collection tube 106 and connection hose 108. For example, support arm 104 may support the direct connection between collection tube 106 and connection hose 108. Additionally or alternatively, support arm 104 may have a passage therethrough that fluidly connects collection tube 106 and connection hose 108.

As already mentioned, handling apparatus 100 may be configured to allow and facilitate movement of support arm 104 relative to base 102. For example, as explained in more detail above, an operator may raise, lower, and/or rotate support arm 104 relative to base 102 by raising, lowering, and/or rotating telescoping member 110. In additional or alternative embodiments, support arm 104 may be configured to move relative to telescoping member 110. For example, support arm 104 may be configured to rotate and/or translate horizontally relative to telescoping member 110 and base 102. To illustrate, support arm 104 may be slidably, rotatably, and/or otherwise movably attached to telescoping member 110. In some examples, support arm 104 may be configured to slide back and forth (e.g., along the Y-axis shown in FIG. 1) and/or rotate (e.g., about the Z-axis shown in FIG. 1) relative to telescoping member 110 to facilitate repositioning of collection tube 106 within collection vessel 200.

Figure 8:
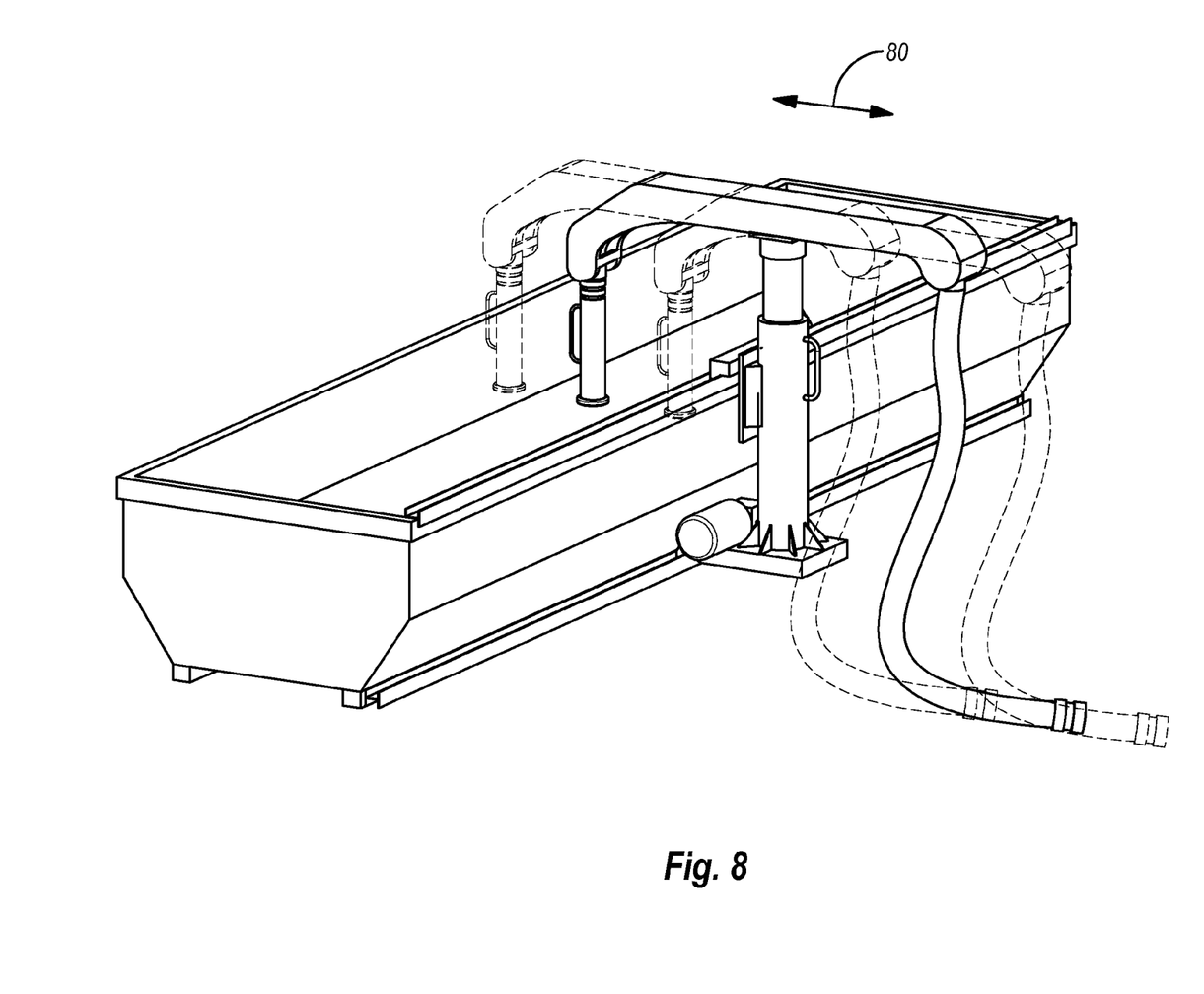
FIG. 8 illustrates a yet further degree of movement of the exemplary vacuum hose handling system of FIG. 1, according to principles described herein.

Exemplary horizontal movement of support arm 104 relative to telescoping member 110 is illustrated in more detail in FIG. 8. As shown, support arm 104 and, as a result, collection tube 106 may move back and forth relative to telescoping member 110 in the directions indicated by arrows 80. Accordingly, an operator may selectively move telescoping member 110 back and forth to reposition collection tube 106 within collection vessel 200 to facilitate collection of waste materials stored in different portions of collection vessel 200.

In some examples, the movement of support arm 104 relative to base 102 and telescoping member 110 may be at least partially motorized or otherwise mechanically assisted. For example, handling apparatus 100 may include one or more drive mechanisms configured to move support arm 104 relative to base 102 and/or telescoping member 110. In some examples, the horizontal and/or rotational movement of telescoping member 110 relative to base 102 may be at least partially automated and/or remotely controlled (e.g., by a control device), as explained in more detail below.

Referring again to FIGS. 1-4, support arm 104 may be manufactured using any suitable materials (e.g., metals, plastics, composites, etc.). In some examples, support arm 104 may include a multi-piece construction (e.g., with multiple pieces welded or otherwise fastened together) or a single-piece construction. In some examples, support arm 104 may be manufactured to be integral with base 102, collection tube 106, and/or connection hose 108. Additionally or alternatively, support arm 104 may be manufactured in any other suitable manner and/or to have any other suitable configuration.

As mentioned, handling apparatus may include collection tube 106 configured to facilitate the collection of waste materials stored in collection vessel 200. In some examples, collection tube 106 may hang from and/or be attached to support arm 104. Additionally or alternatively, collection tube 106 may have an open/free end through which waste materials may be suctioned into and through collection tube 106. Accordingly, an operator may activate a vacuum connected to handling apparatus 100 (e.g., connected to connection hose 108) to suction the materials into and through collection tube 106 and eventually into a vacuum tank, canister, or other receptacle.

Collection tube 106 may have any suitable configuration to facilitate the effective removal of materials from collection vessel 200. In some examples, collection tube 106 may be generally tubular and positioned in a substantially vertical orientation. In addition, collection tube 106 may have any suitable shape and/or size. For example, collection tube 106 may have a size and/or shape that corresponds to connection hose 108 and/or a connected vacuum hose. Although collection tube 106 is illustrated as having a circular cross-section, one will appreciate that collection tube 106 may have any other cross-sectional shape (e.g., square, rectangular, triangular, etc.) that may be desired for a particular implementation.

Collection tube 106 may be formed using any suitable materials and/or methods of manufacture. For example, collection tube 106 may include one or more metals, plastics, other suitable materials, and/or combinations thereof. In some examples, collection tube 106 may have a rigid or semi-rigid configuration to assist in maintaining a desired position of collection tube 106 and/or preventing unwanted movement of collection tube 106.

Collection tube 106 may be directly or indirectly attached to connection hose 108 in any suitable manner. To illustrate, collection tube 106 may fasten directly to connection hose 108 (e.g., by way of one or more fasteners and/or fittings), may be integrally formed with connection hose 108 (e.g., connection hose 108 may be an integral extension of collection tube 106), or may indirectly attach to and be in fluid communication with connection hose 108 by way of support arm 104 (e.g., support arm 104 may include a passage through which collection tube 106 and connection hose 108 fluidly communicate).

In certain embodiments, collection tube 106 may be configured to absorb forces imposed on collection tube 106 during operation. For example, collection tube 106 may include a shock absorber 118 configured to absorb and/or deflect forces on and/or movement of collection tube 106. In some examples, shock absorber 118 may be located near an upper portion of collection tube 106 and may have an accordion-like configuration. In additional or alternative examples, shock absorber 118 may be positioned at any other suitable location and/or may be configured to absorb forces on collection tube 106 in any other suitable manner.

Collection tube 106 may include a handle 116 attached thereto. Handle 116 may be configured to facilitate manual handling or movement of collection tube 106 when necessary or desirable. Handle 116 may be attached to and/or formed with collection tube 106 in any suitable manner. In some examples, handle 116 may be bolted or welded to collection tube 106.

In additional or alternative embodiments, collection tube 106 may include one or more sensor devices. In some examples, the one or more sensor devices may be positioned near the open end of collection tube 106 and/or may be configured to detect the presence of and/or contact with waste materials. For example, the sensor devices may be configured to detect when the open end of collection tube 106 is close to, in contact with, and/or submerged within waste materials. Signals from the sensor devices may be utilized to ensure that collection tube 106 is continuously in contact with, or at an appropriate distance from, waste materials in order to ensure efficient collection of waste materials. The sensor devices may include any suitable sensors such as, but not limited to, moisture sensors, vibration sensors, flow sensors, accelerometers, inclinometers, position sensors, tilt sensors, pressure sensors, tactile sensors, viscometers, motion detectors, and/or any other suitable sensor devices.

As mentioned above, handling apparatus 100 may include a connection hose 108 configured to connect to an open end of an industrial vacuum hose. In some examples, connection hose 108 may be generally tubular and configured to provide fluid communication between a vacuum hose and collection tube 106. Accordingly, for example, suction from the vacuum hose may be extended to collection tube 106 to suction waste materials from collection vessel 200. The suctioned materials may pass through collection tube 106 and connection hose 108 into the vacuum hose and/or a corresponding vacuum tank. In some examples, connection hose 108 may include a fastener 122 at the free end thereof configured to facilitate a secure connection with the vacuum (e.g., a secure connection with the vacuum hose, a secure connection with the vacuum tank, or any other suitable connection with the vacuum).

Connection hose 108 may have any suitable size, shape, and/or configuration. In addition, connection hose 108 may be manufactured using any suitable materials (e.g., metals, plastics, etc.). In some examples, the size, shape, and/or configuration of connection hose 108 may be configured to correspond to and/or facilitate interaction with a corresponding vacuum hose. As an illustrative example, connection hose 108 may be manufactured from one or more plastic materials and/or may have a flexible accordion-like structural configuration to facilitate movement thereof and/or connection to a vacuum hose. Notwithstanding the foregoing example, connection hose 108 may be configured in any other suitable manner as may be desirable for a particular implementation.

As mentioned above, system 10 may additionally or alternatively include a control device configured to facilitate management, control, and/or operation of handling apparatus 100. In some examples, the control device may be configured to allow an operator to control movement of handling apparatus 100 and the components thereof. To illustrate, the control device may allow the operator to move base 102 relative to collection vessel 200, move telescoping member 110 relative to base 102, and/or move support arm 104 relative to telescoping member 110, to cause movement of collection tube 106 relative to collection vessel 200 and/or stored waste materials. In some examples, the control device may include one or more input mechanisms (e.g., such as buttons, keypads, touch screens, mouse devices, switches, knobs, levers, etc.) that the operator can use to control handling apparatus 100 and/or otherwise provide input to the control device.

The control device may include and/or be implemented by any suitable control panel or other control device configured to facilitate control, management, and/or analysis of handling apparatus 100. In some examples, the control device may include a computing device, such as a personal computer, a tablet computer, a smartphone, a PDA, or any other suitable computing device. In certain embodiments, the control device may be a portable device.

In some examples, the control device may be mounted to or otherwise physically connected to handling apparatus 100. For example, the control device may include a control panel mounted to base 102. Alternatively, the control device may be independent of and/or remotely located from handling apparatus 100. For example, the control device may be located within a control room (e.g., located nearby or at a remote location), in a cab of a vehicle (e.g., a vacuum truck), or may be a portable/handheld device configured to be carried by an operator.

In certain embodiments, the control device may be configured to display feedback associated with handling apparatus 100, a corresponding industrial vacuum, and/or collection vessel 200. To illustrate, the control device may be configured to display information regarding the position of handling apparatus 100, flow rates through collection tube 106, the amount and/or location of waste materials within collection vessel 200, the available capacity of a vacuum tank, and/or any other suitable information associated with handling apparatus 100, a corresponding industrial vacuum, and/or collection vessel 200. The control device may be configured to display feedback information by way of one or more display screens, gauges, meters, indicator lights, and/or any other suitable feedback/display devices. In additional or alternative examples, the control device may be configured to display a graphical user interface by way of which an operator may monitor and/or control handling apparatus 100.

As mentioned above, movement of handling apparatus 100 may be at least partially automated. For example, the control device may be configured to automatically move one or more components of handling apparatus 100 in accordance with a predefined program. The predefined program may specify movements of various components of handling apparatus 100 (e.g., relative to each other and/or collection vessel 200) to ultimately define movement of collection tube 106 relative to collection vessel 200. For example, the predefined program may be configured to move collection tube 106 back and forth, and up and down relative to collection vessel 200 to collect waste materials from collection vessel 200. In some examples, the predefined program may specify particular paths, speeds, directions, and/or times of movements for collection tube 106. Thereafter, the control device may effectuate movement of the collection tube 106 in accordance with the predefined program.

In additional or alternative examples, system 10 may include one or more sensor devices (e.g., within collection vessel 200, on handling apparatus 100, such as on collection tube 106, or at any other suitable location) configured to detect the locations and/or levels of materials within collection vessel 200, the location/movement of handling apparatus 100 and components thereof, and/or one or more operational parameters of a vacuum. The sensor devices may include any suitable sensors devices, such as disclosed herein. The sensor devices may be configured to send signals to the control device. In turn, the control device may be configured to automatically move handling apparatus 100 and/or components thereof in accordance with the signals from the sensor devices (e.g., to move collection tube 106 to where the waste materials are located within collection vessel 200). In some examples, the control device may be configured to at least partially override a predefined program in response to signals received from the sensor devices. Additionally or alternatively, the control device may allow an operator to at least partially override an automatic program.

Figure 9:
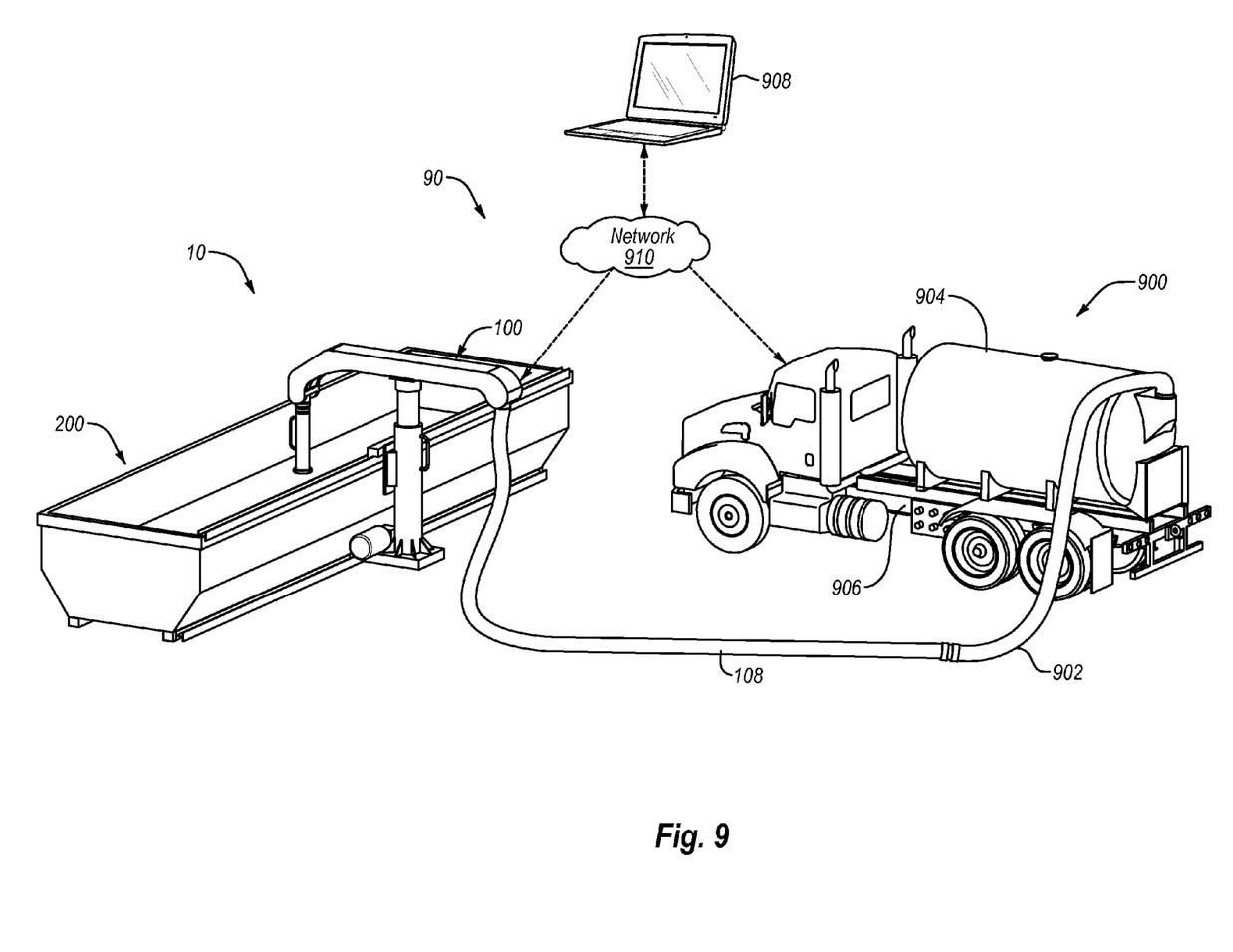
FIG. 9 illustrates the exemplary system of FIG. 1 in combination with a vacuum truck.

As detailed above, handling apparatus 100 may be configured to connect to a vacuum hose of an industrial vacuum. To illustrate, FIG. 9 shows an exemplary implementation 90 of system 10 wherein handling apparatus 100 is operatively connected to a vacuum truck 900. As shown, vacuum truck 900 may include a vacuum hose 902 having an open end connected to connection hose 108, a tank 904, and a frame 906 supporting tank 904. Additionally or alternatively, vacuum truck 900 may have any other suitable features and/or devices (e.g., pumps, blowers, separators, filters, silencers, hoses, etc.) used to facilitate the pneumatic collection and treatment of materials. Vacuum truck 900 is used for illustrative purposes only and is meant to represent one of the many types of industrial vacuums that may be utilized in conjunction with handling apparatus 100.

As further shown in FIG. 9, implementation 90 may also include a control device 908 configured to facilitate control, management, and/or analysis of one or more operational parameters of vacuum truck 900 and handling apparatus 100. In some examples, control device 908 may be configured to function as a centralized control panel for both vacuum truck 900 and handling apparatus 100, thereby removing the need for multiple control devices. To illustrate, in certain embodiments, an operator may utilize control device 908 to operate one or more vacuum blowers associated with vacuum truck 900, to operate a boom line associated with vacuum truck 900, to control movement of one or more components of handling apparatus 100, and/or otherwise control vacuum truck 900 and handling apparatus 100.

In some examples, control device 908 may be configured to automatically control one or more operational parameters of vacuum truck 900 and/or handling apparatus 100. For example, control device 908 may be configured to operate in accordance with a predefined program, in accordance with signals received from one or more sensors devices, and/or in any other suitable manner. To illustrate, control device 908 may receive signals from sensor devices associated with collection vessel 200 and/or handling apparatus 100 indicating the location and/or levels of waste materials within collection vessel 200 and/or the location of collection tube 106. In response to the received signals, control device 908 may be configured to automatically move one or more components of handling apparatus 100 to reposition (e.g., horizontally, vertically, and/or rotationally) collection tube 106 within collection vessel 200 to collect the sensed waste materials. As another example, control device 908 may be configured to automatically shut down vacuum truck 900 in response to a signal received from a sensor device indicating a safety risk.

As shown, control device 908 may be remote from handling apparatus 100 and vacuum truck 900. For example, control device 908 may be configured to move and operate independent of handling apparatus 100 and vacuum truck 900. Accordingly, an operator of control device 908 may carry control device 908 and freely move while still having the capability of controlling and monitoring the operation of handling apparatus 100 and vacuum truck 900. In alternative embodiments, control device 908 may be mounted on or directly connected to handling apparatus 100 and/or vacuum truck 900.

Control device 908 may be configured to communicate with handling apparatus 100, vacuum truck 900, one or more sensor devices, and/or any other suitable device (e.g., a remote server) using any wired or wireless communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Short Message Service ("SMS"), Multimedia Message Service ("MMS"), radio frequency ("RF") signaling technologies, Bluetooth technologies, ANT+ technologies, other wireless communication technologies, and other suitable communications technologies.

In certain embodiments, control device 908 may communicate with handling apparatus 100 and vacuum truck 900 via a network 910, which may include one or more networks, including, but not limited to, wireless communication networks (e.g., Bluetooth networks, 3G and 4G networks, etc.), mobile telephone networks (e.g., cellular telephone networks), satellite networks, navigation networks, the Internet, LANs, wide area networks (WANs), and any other networks capable of carrying data and/or communications signals.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 10:
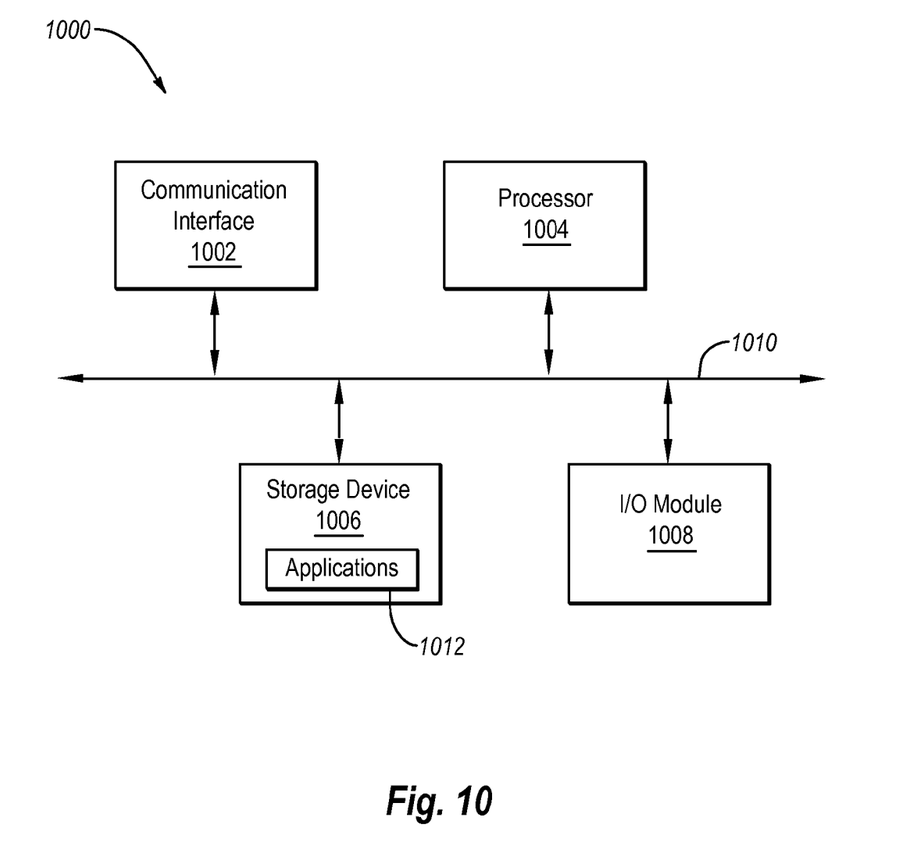
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, and any other suitable interface. In at least one embodiment, communication interface 1002 may provide a direct connection between system 100 and one or more provisioning systems via a direct link to a network, such as the Internet. Communication interface 1002 may additionally or alternatively provide such a connection through, for example, a local area network (such as an Ethernet network), a personal area network, a telephone or cable network, a satellite data connection, a dedicated URL, or any other suitable connection. Communication interface 1002 may be configured to interface with any suitable communication media, protocols, and formats, including any of those mentioned above.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium. For example, processor 1004 may direct execution of one or more programs defining control of handling apparatus 100.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1006. For example, data representative of one or more executable applications 1012 (which may include, but are not limited to, one or more of the software applications described herein) configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with handling apparatus 100, vacuum truck 900, and/or control device 908.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

I claim:

1. A vacuum hose handling apparatus configured to facilitate movement of a collection tube relative to a collection vessel that is configured for holding waste material, the apparatus comprising:
    a base that is oriented along a first directional axis, the base including a connector configured to interface with a rail of the collection vessel to at least partially attach the base directly to the collection vessel such that the base is external to a volume defined by the collection vessel for holding the waste material, wherein the interface between the connector and the rail enables a movement of the base relative to the collection vessel along a second directional axis that is substantially perpendicular to the first directional axis;
    a support arm having an elongated shape that is oriented along a third directional axis that is substantially perpendicular to the first directional axis, the support arm including a first end that, when the base is attached to the collection vessel, is positioned over an opening to the volume;
    a telescoping member that extends from the base in a first direction oriented along the first directional axis to an underside of the support arm and operatively couples the support arm to the base forming a T-shaped configuration between the telescoping member and the support arm, the telescoping member being configured to selectively extend and retract in the first direction relative to the base;
    a connection hose configured to connect to an industrial vacuum; and
    a collection tube that is attached to the support arm at the first end and in fluid communication with the connection hose, wherein the collection tube includes an open end for pneumatically collecting waste materials from the volume defined by the collection vessel.

2. The apparatus of claim 1, wherein the support arm is configured to translate relative to the base and to the telescoping member.

3. The apparatus of claim 2, wherein the telescoping member and the support arm are configured to rotate relative to the base about a rotational axis parallel to the first directional axis.

4. The apparatus of claim 3, further comprising one or more drive mechanisms that are configured to selectively move the base relative to the collection vessel, selectively translate the support arm, and selectively rotate the telescoping member and the support arm.

5. The apparatus of claim 4, further comprising:
    a control device configured to control the drive mechanisms; and
    one or more sensor devices in communication with the control device,
    wherein the control device is configured to automatically move the collection tube in accordance with signals received from the one or more sensor devices.

6. The apparatus of claim 5, wherein the one or more sensor devices include a moisture sensor, a vibration sensor, and a flow sensor.

7. The apparatus of claim 1, further comprising one or more handles attached to at least one of the base, the support arm, and the collection tube.

8. The apparatus of claim 1, further comprising a shock absorber associated with the collection tube.

9. The apparatus of claim 1, wherein the connection hose is configured to connect to an open end of a vacuum hose associated with the industrial vacuum.

10. The apparatus of claim 1, wherein the connection hose is integrated into the collection tube.

11. The apparatus of claim 1, wherein:
the support arm defines a passage in fluid connection with the connection hose and the collection tube;
the collection tube is oriented along the first directional axis;
the collection tube includes a shock absorber at an upper portion of the collection tube at which the collection tube is connected to the support arm; and
the collection tube includes a rigid configuration.

12. The apparatus of claim 1, further comprising another connector that is configured to connect to another rail of the collection vessel.

13. A vacuum hose handling apparatus configured to facilitate movement of a collection tube relative to a collection vessel that is configured for holding waste material, the apparatus comprising:
a base that is oriented along a first directional axis, the base including a connector configured to interface with a rail of the collection vessel to at least partially attach the base directly to the collection vessel such that the base is external to a volume defined by the collection vessel, wherein the interface between the connector and the rail enables a movement of the base relative to the collection vessel along a second directional axis that is substantially perpendicular to the first directional axis;
a support arm having an elongated shape, the support arm including a first end that, when the base is attached to the collection vessel, is positioned over an opening to the volume defined by the collection vessel;
a telescoping member that operatively couples the support arm to the base and is configured to selectively extend and retract relative to the base and to rotate about a rotational axis parallel to the first directional axis, wherein the telescoping member extends from the base in a first direction oriented along the first directional axis forming a T-shaped configuration with the support arm;
a connection hose configured to connect to an industrial vacuum; and
a collection tube attached to the support arm and in fluid communication with the connection hose, wherein the collection tube has an open end for pneumatically collecting waste materials from the collection vessel.

14. The apparatus of claim 13, further comprising one or more drive mechanisms configured to selectively effectuate the movement of the collection tube relative to the collection vessel.

15. The apparatus of claim 14, further comprising:
a control device configured to control the drive mechanisms; and
one or more sensor devices in communication with the control device,
wherein the control device is configured to automatically move the collection tube in accordance with signals received from the one or more sensor devices.

16. The apparatus of claim 13, wherein:
the support arm defines a passage in fluid connection with the connection hose and the collection tube;
the collection tube is oriented along first directional axis;
the collection tube includes a shock absorber at an upper portion of the collection tube at which the collection tube is connected to the support arm; and
the collection tube includes a rigid configuration.

17. A system comprising:
a collection vessel that defines a volume that is configured to at least temporarily store waste materials, wherein the collection vessel includes a rail; and
a vacuum hose handling apparatus configured to facilitate movement of a collection tube relative to the collection vessel, wherein the vacuum hose handling apparatus includes:
a base that is oriented along a first directional axis, the base including a connector configured to interface with the rail to at least partially attach the base directly to the collection vessel such that the base is external to the volume, wherein the interface between the connector and the rail enables a movement of the base relative to the collection vessel along a second directional axis that is substantially perpendicular to the first directional axis;
a support arm having an elongated shape that is oriented along a third directional axis that is substantially perpendicular to the first directional axis, the support arm including a first end that, when the base is attached to the collection vessel, is positioned over an opening to the volume defined by the collection vessel, wherein the support arm is configured to translate relative to the base;
a telescoping member that extends from the base in a first direction oriented along the first directional axis to an underside of the support arm and operatively couples the support arm to the base forming a T-shaped configuration between the telescoping member and the support arm, the telescoping member being configured to selectively extend and retract in the first direction relative to the base and to rotate relative to the base about a rotational axis parallel to the first directional axis;
a connection hose configured to connect to an industrial vacuum; and
a collection tube that hangs from the first end of the support arm oriented along the first directional axis and in fluid communication with the connection hose, wherein the collection tube has an open end for pneumatically collecting waste materials from the collection vessel.

18. The system of claim 17, wherein the industrial vacuum comprises a vacuum truck.

19. The system of claim 17, further comprising a control device configured to control the movement of the collection tube relative to the collection vessel.

20. The system of claim 17, wherein:
the support arm defines a passage in fluid connection with the connection hose and the collection tube;
the collection tube is oriented along the first directional axis;
the collection tube includes a shock absorber at an upper portion of the collection tube at which the collection tube is connected to the support arm; and
the collection tube includes a rigid configuration.

21. The system of claim 17, further comprising one or more drive mechanisms that are configured to selectively move the base relative to the collection vessel, selectively translate the support arm, and selectively rotate the telescoping member.

22. The system of claim 21, further comprising:
a control device configured to control the drive mechanisms; and
one or more sensor devices in communication with the control device,
wherein the control device is configured to automatically move the collection tube in accordance with signals received from the one or more sensor devices.

* * * * *